United States Patent [19]
Cho

[11] Patent Number: 5,878,247
[45] Date of Patent: Mar. 2, 1999

[54] AUTOMATIC DATA BACKUP APPARATUS FOR MICROCOMPUTER

[75] Inventor: Dong-Soo Cho, Kyungki-Do, Rep. of Korea

[73] Assignee: Goldstar Electron Co., Ltd., Cheongju, Rep. of Korea

[21] Appl. No.: 899,597

[22] Filed: Jul. 24, 1997

Related U.S. Application Data

[63] Continuation of Ser. No. 382,705, Feb. 2, 1995, abandoned.

[30] Foreign Application Priority Data

Feb. 3, 1994 [KR] Rep. of Korea .................... 1994 2015

[51] Int. Cl.$^6$ ............................. G06F 11/22; G06F 11/28
[52] U.S. Cl. ...................... 395/500; 395/182.11; 364/187
[58] Field of Search ............................ 364/187; 395/500, 395/182.11

[56] References Cited

U.S. PATENT DOCUMENTS 4,654,819 3/1987 Stiffler et al. ........................ 364/900

FOREIGN PATENT DOCUMENTS 4-125740 4/1992 Japan .............................. G06F 11/22

OTHER PUBLICATIONS

Ota et al. (translation of Japanese Patent 4–125740, published on Apr. 27, 1992, translated by Schreiber Translation, Inc., Aug. 1998).

*Primary Examiner*—Kevin J. Teska
*Assistant Examiner*—Phallaka Kik
*Attorney, Agent, or Firm*—Fleshner & Kim

[57] ABSTRACT

An improved automatic data backup apparatus for a microcomputer capable of automatically backing up a user's program at a central processing unit(CPU), which includes a central processing unit(CPU) for performing a user program and a monitor program outputted from a first emulator input/output circuit and a data/address bus; a second emulator input/output circuit for outputting a register signal applied thereto and for inputting/outputting a data between a register data bus connected to an emulator and a backup register bus; and a data backup storing circuit for automatically backing up a data stored in a register of the CPU corresponding to a user program performed in the CPU in accordance with a monitor program request signal outputted from the second emulator input/output circuit, a register signal, a register recording signal, and a register judgement signal and for applying a data stored in a register in the CPU corresponding to a user program which is changed by a backed-up monitor program.

3 Claims, 4 Drawing Sheets

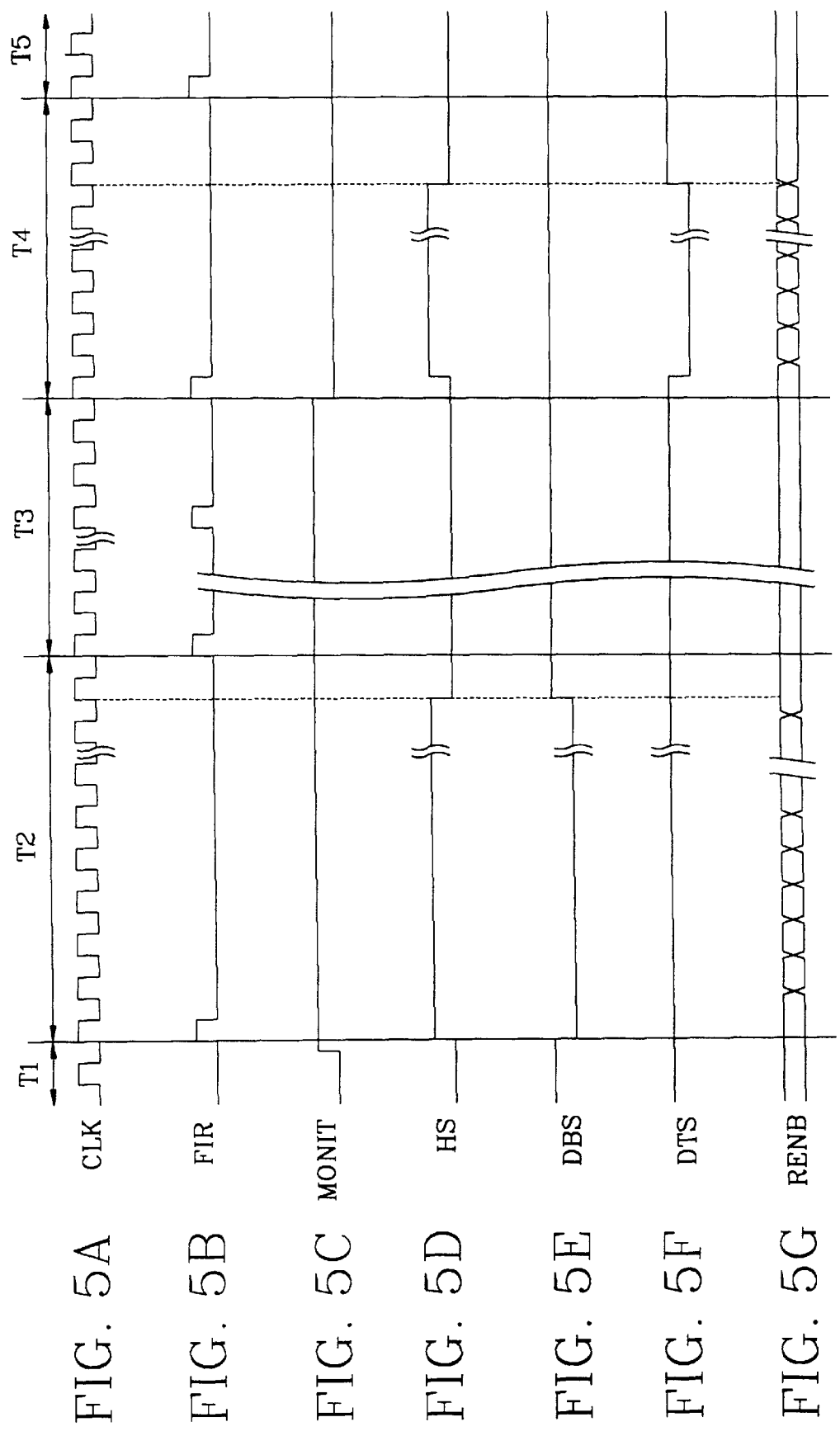

1

AUTOMATIC DATA BACKUP APPARATUS FOR MICROCOMPUTER

This application is a continuation of application Ser. No. 08/382,705 filed Feb. 2, 1995 now abandoned.

BACKGROUND OF THE INVENTION

1. Field of the Invention

The present invention relates to an automatic data backup apparatus for a microcomputer, and particularly to an improved automatic data backup apparatus for a microcomputer capable of automatically backing up a user program from a central processing unit(CPU).

2. Description of the Conventional Art

Conventionally, a conventional microcomputer development system(MDS) includes programs such as an assembler performed in a personal computer or a host machine, a linker, and a debugger, an emulator and a user system.

In addition, an emulator includes a process for generally controlling the whole operation of the emulator, an apparatus for storing a user program outputted from the host machine, an apparatus for storing a monitor program for displaying an operation state of a target microcomputer such as the information of registers, various flags, the information of program counter and data stored in RAM when a user program is performed in the target microcomputer in the user system, an apparatus for storing the information of the target microcomputer, and a microcomputer for performing a user program or a monitor program in accordance with a control of the processor.

Referring to FIG. 1, a conventional microcomputer for an emulator which has the same construction as the target microcomputer includes an interface input/output circuit 1 for inputting/outputting commands and data between an emulator EM or a user system US and a data/address bus D/A-BUS, a peripheral apparatus 2 for interfacing the data/address bus D/A-BUS and the command/data, a memory 3 for storing data outputted from the data/address bus D/A-BUS, and a CPU 4 for performing a user program outputted from the data/address bus D/A-BUS and for performing a monitor program in accordance with a control signal CS outputted from the emulator.

Referring to FIG. 2, a conventional microcomputer which does not have the same construction as the target microcomputer includes a peripheral apparatus 2, a memory 3 and a CPU which is the same construction as in FIG. 1, and instead of the interface input/output circuit 1 shown in FIG. 1, it includes a target microcomputer input/output circuit 1—1 for inputting/outputting commands and data between the user system US and the data/address bus D/A-BUS and an emulator input/output circuit 1–2 for inputting/outputting commands and data between the emulator and the data/address bus D/A-BUS.

The operation of the conventional microcomputer having the same construction as the target microcomputer will now be explained.

To begin with, when a user input a predetermined command into the target microcomputer at the user's system in order to input a desired program using a host computer, the user program is stored into an apparatus through the host computer and applies to the CPU through the interface input/output circuit 1 and the data/address bus D/A-BUS in accordance with a control of the CPU 4.

Thereafter, the CPU 4 withdraws data necessary for performing the user program previously stored in the memory 3 and performs the user program by receiving the data outputted from the peripheral apparatus through the data/address bus D/A-BUS.

When the operation of the user program is finished in the CPU 4, the user program is applied to the user system US through the data/address bus D/A-BUS and the interface input/output circuit 1.

Meanwhile, when a user input a predetermined command into the computer in order to see the state of the target microcomputer at the user system while performing the user program in the CPU 4, the CPU 4 outputs data corresponding to the result and the state of the user program which is performed therein by a control signal CS outputted from the processor of the emulator.

The data corresponding to the result and the state of the user program is stored into the emulator EM through the data/address bus D/A-BUS and the interface input/output circuit 1.

Thereafter, the monitor program of the emulator is applied to the CPU 4 through the interface input/output circuit 1 and the data/address bus D/A-BUS in accordance with the control of the processor.

In addition, the CPU 4 receives the data necessary to perform the monitor program at the peripheral apparatus 2 and the memory 3.

Thereafter, when the operation of the monitor program is finished, the data corresponding to the result and state of the user program stored in the emulator EM is applied to the CPU 4 through the interface input/output circuit 1 and the data/address bus D/A-BUS. Here, the CPU 4 performs the user program.

In addition, the data corresponding to the state of the target microcomputer at the user system US is stored into a predetermined apparatus through the interface input/output circuit 1, and the stored data is applied to the host computer under the control of the processor.

Thereafter, a user recognizes the state of the target microcomputer and performs necessary actions corresponding to the state thereof.

In addition, the command and data outputted to the user system by splitting the operation of the interface input/output circuit 1 at the conventional microcomputer which has the same construction as the above-mentioned target microcomputer are also inputted/outputted through the target microcomputer input/output circuit 1—1. The command and data outputted to the emulator EM is also inputted/outputted through the emulator input/output circuit 102.

In addition, the operation of the peripheral apparatus 2, the memory 3 and the CPU 4 is the same as the above-mentioned target microcomputer, so that the detailed description is omitted.

However, the conventional microcomputer having the same construction as the target microcomputer should be equipped with an additional split transmittance apparatus for splitting the signal and for transferring the split signal to the interface input/output apparatus.

In addition, the monitor program should be performed after backing up the data and address corresponding to the user program. In addition, the processor should performs complicated controls whenever the monitor program is performed in the CPU since the user program should be returned back after the monitor program is performed, so that additional apparatus for storing the data and address corresponding to the performing state of the user program in the emulator is needed.

SUMMARY OF THE INVENTION

Accordingly, it is an object of the present invention to provide an automatic data backup apparatus for a microcomputer.

It is another object of the present invention to provide an improved automatic data backup apparatus for a microcomputer capable of automatically backing up a user program at a central processing unit.

To achieve the above objects, there is provided an automatic data backup apparatus for a microcomputer, which includes a central processing unit(CPU) for performing a user program and a monitor program outputted from a first emulator input/output circuit and a data/address bus; a second emulator input/output circuit for outputting a register signal applied thereto and for inputting/outputting a data between a register data bus connected to an emulator and a backup register bus; and a data backup storing circuit for automatically backing up a data stored in a register of the CPU corresponding to a user program performed in the CPU in accordance with a monitor program request signal outputted from the second emulator input/output circuit, a register signal, a register recording signal, and a register judgement signal and for applying a data stored in a register in the CPU corresponding to a user program which is changed by a backed-up monitor program.

BRIEF DESCRIPTION OF THE DRAWINGS

FIG. 5A to 5G is a view shown operation time of each part of FIG. 4.

DETAILED DESCRIPTION OF THE INVENTION

Figure 1:
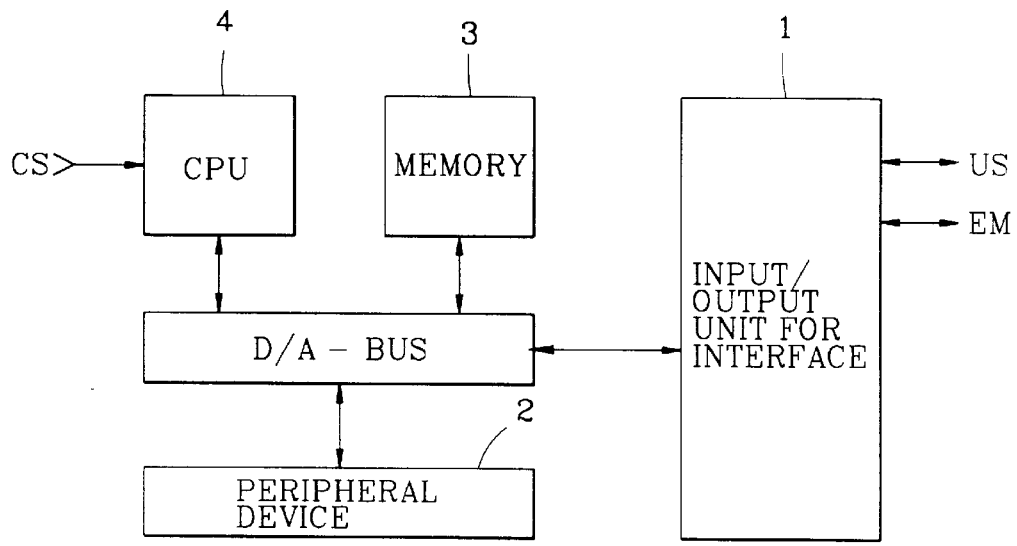
FIG. 1 is a block diagram showing a construction of a conventional microcomputer for an emulation which has the same construction as the target microcomputer.
Figure 2:
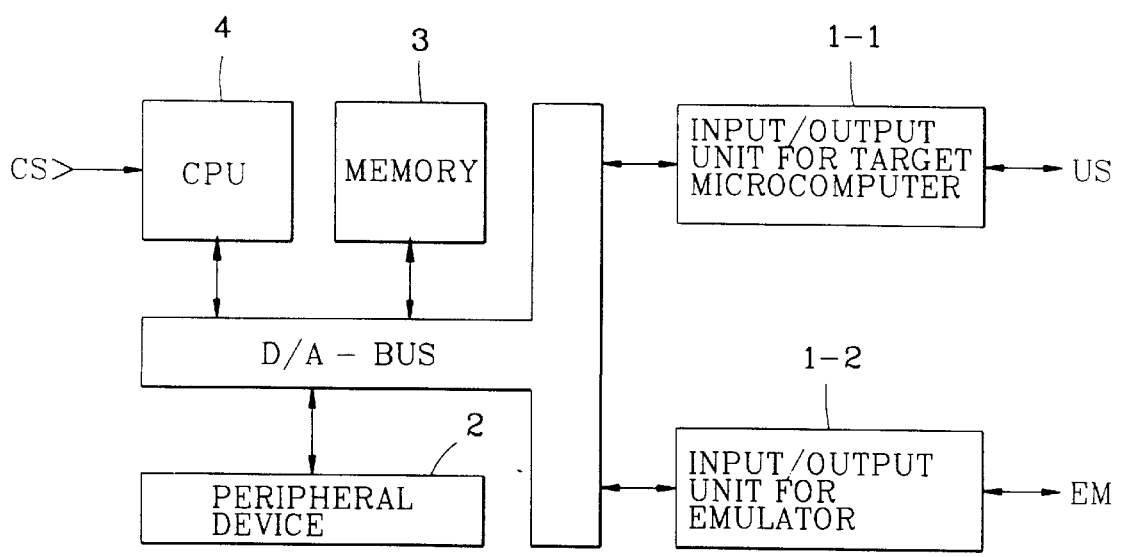
FIG. 2 is a block diagram showing a construction of a conventional microcomputer for an emulation which has not the same construction as the target microcomputer.
Figure 3:
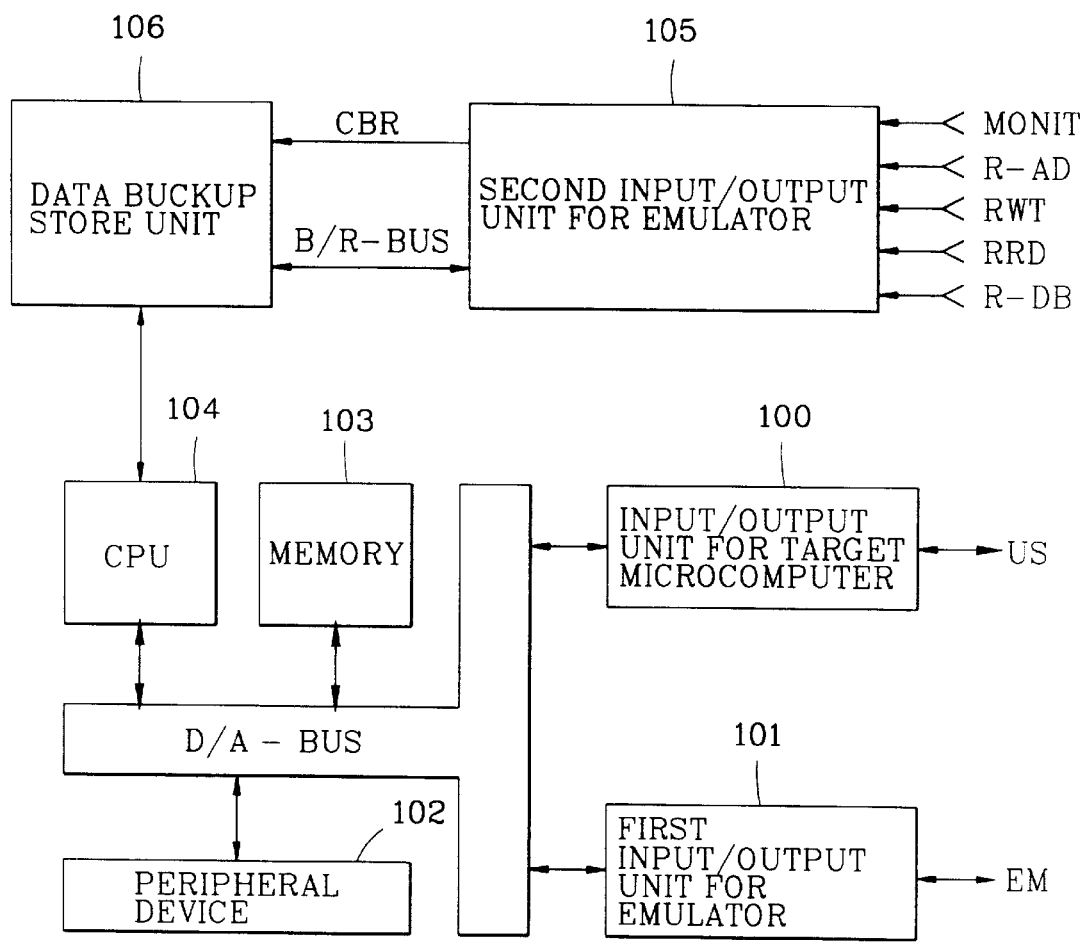
FIG. 3 is a block diagram showing a construction of an automatic data backup apparatus for a microcomputer according to the present invention.

Referring to FIG. 3, an automatic data backup apparatus for a microcomputer according to the present invention includes a target microcomputer input/output circuit 100 for inputting/outputting commands and data between a target microcomputer and a data/address bus D/A-BUS at a user system US, a first emulator input/output circuit 101 for inputting/outputting commands and data between a emulator and the data/address bus D/A-BUS, a peripheral apparatus 102 for interfacing commands and data with the data/address bus D/A-BUS, a memory 103 for storing data outputted from the data/address bus D/A-BUS, a CPU 104 for performing the user program and the monitor program outputted from the data/address bus D/A-BUS, a second emulator input/output circuit 105 for inputting/outputting a register address signal outputted from a monitor program request signal MONIT outputted from the emulator EM, a register recording signal RWT and a register judgement signal RRD from the emulator EM, a register address bus R-AD and a register data bus R-DB connected to the emulator for inputting/outputting data and the backup register bus B/R-BUS, and a data backup store circuit 106 for automatically backing up the register data corresponding to the user program which is performed in the CPU in accordance with a signal corresponding to the monitor program request signal MONIT outputted from the second emulator input/output circuit 105, register address signal, a register recording signal RWT, and a register judgement signal RRD and backup register control signals CBR, and for applying the register data in the CPU corresponding to the user program when the monitor program is finished in the CPU 104.

Figure 4:
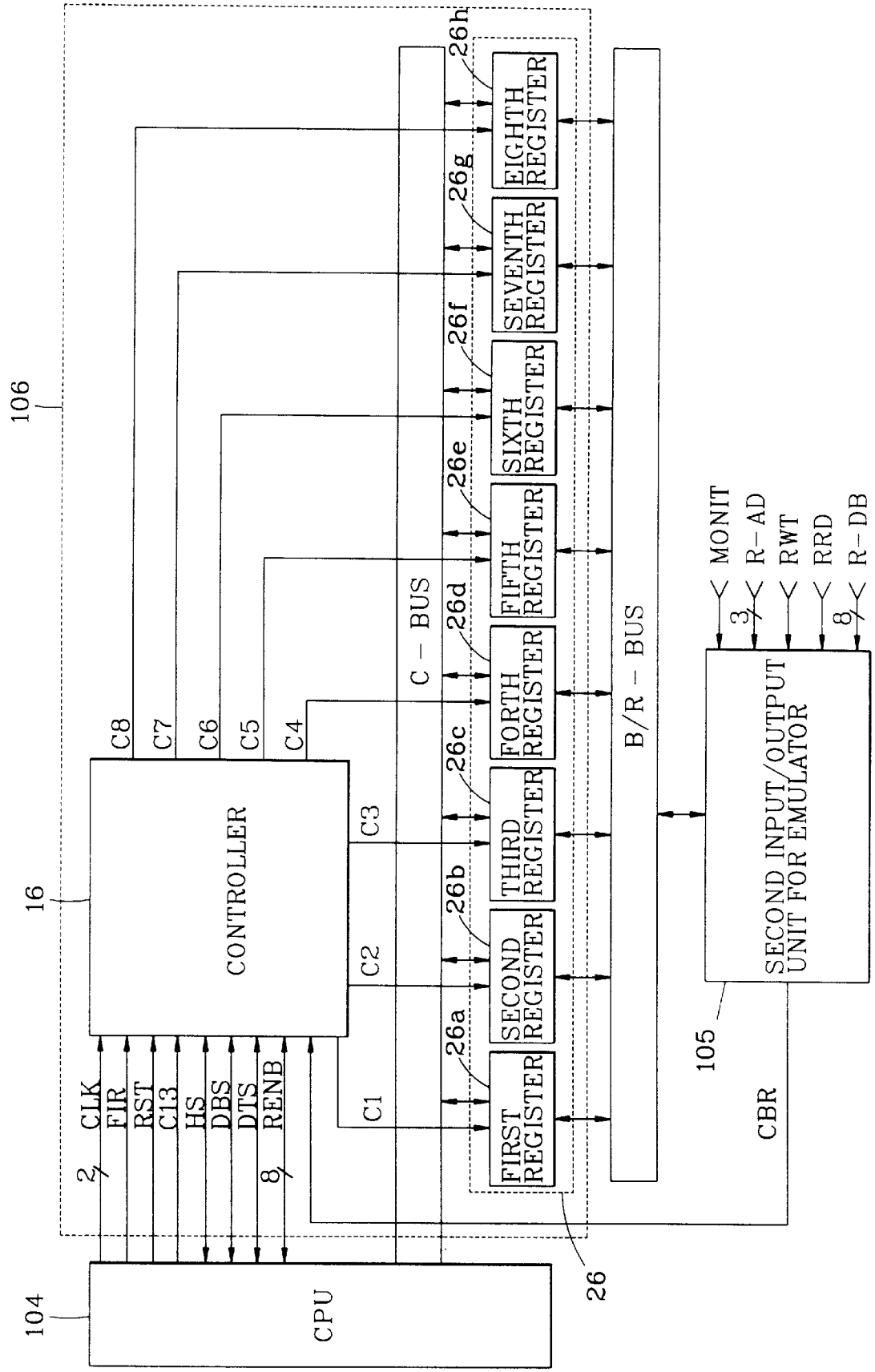
FIG. 4 is a block diagram showing a part in detail which is shown in FIG. 3.

In addition, referring to FIG. 4, the data backup store circuit 106 includes a controller 16 for storing the user program performed in the CPU 104 in accordance with the monitor program request signal MONIT outputted from the second emulator input/output circuit 105, a register recording signal RWT, a register judgement signal RRD, a clock signal outputted from the CPU 104, a command withdraw signal FIR, a reset signal RST and a control signal C13 and for outputting a micro ROM holder signal HS to return to the user program backed up when the monitor program is performed in the CPU 104, a data backup signal DBS, a data returning signal DTS, a register lead signal RENB and a first control signal C1 to eighth control signal C8, and a register circuit 26 having first registers 26a to 26h for returning to the user program outputted from the CPU internal bus C-BUS in accordance with first control signals C1 to C8 outputted from the controller 16.

The operation of the data backup apparatus for a microcomputer according to the present invention will now be explained.

To begin with, when a user inputs a desired program such as a user program into the emulator using a host computer, the clock signal outputted from the CPU 104 and the command withdraw signal FIR and the reset signal RST and the control signal C13 which are outputted from the CPU 104 are applied to the control circuit 16 of the data backup storing circuit 106.

In addition, the emulator, as shown in FIG. 5, applies a predetermined data outputted from the monitor program request signal MONIT and a address signal outputted from the register address bus R-AD, a register recording signal RWT, a register judgement signal RRD, and a register data bus R-DB to the second emulator input/output circuit 105.

Thereafter, the second emulator input/output circuit 105 applies the signals corresponding to the address signal and a predetermined data and signal MONIT, RWT and RRD.

Accordingly, as shown in FIGS. 5D, 5E, 5F and 5G, the controller 16 recognizes a predetermined address signal, a predetermined data and signals MONIT, RWT and RRD and applies a low micro ROM hold signal HS, a high data backup signal DBS, a data returning signal DTS, and a register lead signal RENB to the CPU 104, respectively.

Thereafter, the CPU 104 performs the user program outputted from the first emulator input/output circuit 101 and the data/address bus D/A-BUS in accordance with the signals HS, DTS, and RENB.

Meanwhile, while the user program is performed in the CPU 104, when a user input a predetermined signal into the computer using the host computer in order to recognize the target microcomputer in the user system US, the clock signal CLK, a high and low state command withdraw signal FIR and the reset signal RST and the control signal C13 which are outputted from the CPU 104 are respectively applied to the control circuit 16 in the data backup storing circuit 106.

In addition, the emulator shown in FIG. 5C, for a predetermined time T2, a predetermined data outputted from a predetermined address signal outputted from the high state monitor program request signal MONIT, the register address bus R-AD, the register recording signal RWT, the register judgement signal RRD, and the register data bus R-DB are respectively applied to the second emulator input/output circuit 105.

Thereafter, the second emulator input/output applies a predetermined signal corresponding to the address signals, a predetermined data and signal MONIT, RWT, and RRD to the control circuit 16, respectively.

Accordingly, as shown in FIGS. 5D, 5E, 5F and 5G, for a predetermined time T2, the control circuit 16 recognizes a predetermined address signal and signals MONIT, RWT and RRD and applies the high state data returning signal DTS, the register lead signal RENB to the CPU 104. In addition, the control circuit 16 applies the first control signal C1 to the eighth control signals C8 and the first register 26a to the eighth register 26h in the register circuit 26.

Thereafter, the CPU 104 outputs the data corresponding to the user program performed by the signals DBS and RENB and the CPU is disenabled thereby.

Thereafter, the first to eighth registers 26a to 26b in the register circuit 26 stores each different data outputted from the internal bus C-BUS in accordance with the first control signal C1 to the eight control signal C8 outputted from the control circuit 16.

Thereafter, when the data corresponding to the user program performed in the CPU 104 is stored into the first register 26a to the eighth register 26h of the register 26, as shown in FIGS. 5A and 5B, for a predetermined time T3, the clock signal CLK outputted from the CPU, the high and low state command withdraw signal FIR, the reset signal RST and the control signal C13 are applied to the control circuit 16, respectively.

In addition, as shown in FIG. 5C, for a predetermined time T3, the emulator applies a predetermined address signal, register recording signal RWT and a register judgement signal RRD which are outputted from the high state monitor program request signal MONIT and the register address bus R-AD and a predetermined data outputted from the register data bus R-DB to the second emulator input/output circuit 105, respectively.

Thereafter, the second emulator input/output circuit 105 applies a predetermined signal corresponding to a predetermined address signal and signals MONIT, RWT and RRD to the control circuit 16.

Therefore, as shown in FIGS. 5D, 5E, 5F, and 5G, for a predetermined T3, the control circuit 16 recognizes signals corresponding to a predetermined address signal and signals MONIT, RWT and RRD and applies a low state micro ROM hold signal HS, a high state data backup signal DBS, a high state data returning signal DTS and a lead address signal RENB to the CPU 104, respectively, and applies the first control signal C1 to the eighth control signal C8 to the first register 26a to the eighth register 26h of the resister circuit 26, respectively.

Thereafter, the CPU 104 is enabled by an applied signal HS and performs the monitor program outputted from the first emulator input/output circuit 101 and the data/address bus D/A-BUS.

Thereafter, when the operation of the monitor program is finished in the CPU 104, as shown in FIGS. 5A and 5B, for a predetermined time T4, the clock signal CLK, the high and low state command withdraw signal FIR, the reset signal RST and the control signal C13 are applied to the control circuit 16 in the data backup storing circuit 106.

In addition as shown in FIG. 5C, for a predetermined time T4, the emulator processor applies a predetermined address signal, a register recording signal RWT, a register judgement signal RRD and a register data bus R-DB which are outputted from the low state monitor program request signal MONIT and the register address bus R-AD to the second emulator input/output circuit 105.

Thereafter, the second emulator input/output circuit 105 applies a predetermined address signal and signals MONIT, RWT and RRD to the control circuit 16.

Therefore, as shown in FIGS. 5D, 5E, 5F and 5G, for a predetermined T4, the control circuit 16 recognizes signal corresponding to a predetermined address signal and signals MONIT, RWT and RRD and applies the high state micro ROM hold signal HS, the high state data backup signal DBS, the low state data returning signal DTS and the lead address signal RENB to the CPU, respectively and applies the first control signal C1 to the eighth control signals C8 to the first register 26a and the eighth register 26h of the register circuit 26.

Therefore, the first register 26a to the eighth register 26h applies the data corresponding to the user program to the CPU internal bus C-BUS in accordance with the first control signal C1 and the eighth control signal C8 which are each outputted from the control circuit 16.

Thereafter, the CPU 104 receives the data corresponding to the user program outputted from the CPU internal bus C-BUS and performs the user program for a predetermined time T5 in accordance with the signal DTS and RENB applied thereto.

As described above, the automatic data backup apparatus for the microcomputer according to the present invention automatically stores the user program while the user program is active in the CPU. In addition, in order to perform the user program when the monitor program is finished, it is possible to automatically return the register data in the CPU corresponding to the user program, thereby making it easy for debugging, whereby an additional apparatus for storing the backed up data is not needed on the emulator.

What is claimed is:

1. A microcomputer for an emulator, comprising:
    a first emulator input/output unit for receiving one of user and monitor programs from the emulator;
    a central processing unit (CPU) that performs an emulation based on one of the user and monitor programs;
    a data/address bus connecting said first emulator input/output unit and said CPU such that said CPU performs one of the user and monitor programs;
    a memory coupled to said data/address bus for storing data provided through said data/address bus;
    a second emulator input/output unit for receiving at least one of a plurality of first control signals, data signals and address signals from the emulator; and
    a data backup store unit coupled to said second emulator input/output unit through a backup register bus and coupled to said CPU, said data backup store unit automatically backing up a data stored in a register of said CPU during execution of the user program, corresponding to the user program performed in said CPU, in accordance with said plurality of first control signals provided through said backup register bus from the second emulator input/output unit, wherein
    said data backup store unit allows feeding back the data stored in said data backup store unit into the register of said CPU after execution of a monitoring program and allows sending and receiving of the data through said second emulator input/output unit, independent of said CPU.

2. The apparatus of claim 1, wherein said data backup store unit comprises:
- a controller for recognizing said plurality of control signals provided from said second emulator input/output unit and being responsive to a plurality of second control signals from said CPU; and
- a register circuit for storing said data stored in said register of said CPU corresponding to said user program performed in said CPU, wherein said register circuit is responsive to a plurality of third control signals generated by said controller for feeding-back the data into the register of said CPU.

3. The apparatus of claim 2, wherein said register circuit comprises a plurality of registers coupled to said CPU through an internal bus, and coupled to said second emulator input/output unit through said backup register bus.

* * * * *